United States Patent
Bagge et al.

(10) Patent No.: US 10,451,718 B2
(45) Date of Patent: Oct. 22, 2019

(54) ULTRASOUND SIGNAL ANALOG BEAMFORMER / BEAMFORMING

(71) Applicant: B-K Medical Aps, Herlev (DK)

(72) Inventors: Jan P. Bagge, Stenlose (DK); Nitsan Vardi, Hillerod (DK); Henrik Jensen, Bagsvaerd (DK)

(73) Assignee: B-K Medical Aps, Herlez (DK)

(*) Notice: Subject to any disclaimer, the term of this patent is extended or adjusted under 35 U.S.C. 154(b) by 306 days.

(21) Appl. No.: 15/503,288

(22) PCT Filed: Aug. 13, 2014

(86) PCT No.: PCT/IB2014/063900
§ 371 (c)(1),
(2) Date: Feb. 10, 2017

(87) PCT Pub. No.: WO2016/024147
PCT Pub. Date: Feb. 18, 2016

(65) Prior Publication Data
US 2017/0227630 A1  Aug. 10, 2017

(51) Int. Cl.
*G01S 7/52* (2006.01)
*G01S 15/89* (2006.01)
*G10K 11/34* (2006.01)

(52) U.S. Cl.
CPC ...... *G01S 7/52085* (2013.01); *G01S 7/52025* (2013.01); *G01S 7/52044* (2013.01); *G01S 15/8915* (2013.01); *G10K 11/346* (2013.01)

(58) Field of Classification Search
CPC ............. G01S 7/52085; G01S 7/52044; G01S 7/52025; G01S 15/8915; G10K 11/346
See application file for complete search history.

(56) References Cited

U.S. PATENT DOCUMENTS 5,676,147 A    10/1997  Petrofsky et al.
6,126,602 A    10/2000  Savord et al.
(Continued)

FOREIGN PATENT DOCUMENTS

CN    106796286 A  *  5/2017  ......... G01S 7/52025
EP     1464937 A1      6/2004
(Continued)

OTHER PUBLICATIONS

International Search Report for PCT/IB2014/063900 published as WO2016/024147 A1 dated Feb. 18, 2015.
(Continued)

*Primary Examiner* — Daniel Pihulic
(74) *Attorney, Agent, or Firm* — Anthony M. Del Zoppo, III; Daugherty & Del Zoppo Co. LPA (57) ABSTRACT

An apparatus (402) includes an analog beamformer (414) that receives a set of analog RF signals. The set of analog RF signals are generated by a corresponding set of transducer elements (406) receiving ultrasound echo signals. The analog beamformer includes a delay network (416) with a set of phase shifting networks (506). Each phase shifting network of the set of phase shifting networks processes a different one of the analog RF signals of the set of analog RF signals. Each phase shifting network of the set of phase shifting networks adds a delay to the corresponding analog RF signal, producing a set of delayed analog RF signals that are aligned in time. The set of phase shifting networks does not use an inductive element to determine or add the delays. The analog beamformer further includes a summer (504) that sums the delayed analog RF signals, producing an analog beam sum.

19 Claims, 9 Drawing Sheets

(56) References Cited

U.S. PATENT DOCUMENTS

| | | |
|---|---|---|
| 6,393,083 B1 | 5/2002 | Beukema |
| 8,523,774 B2 | 9/2013 | Yen et al. |
| 2017/0227630 A1* | 8/2017 | Bagge ................. G01S 7/52025 |

FOREIGN PATENT DOCUMENTS

| | | | | |
|---|---|---|---|---|
| EP | 3195004 A1 * | 7/2017 | ......... | G01S 7/52025 |
| JP | H08237040 A | 9/1996 | | |
| WO | WO-2016024147 A1 * | 2/2016 | ......... | G01S 7/52025 |
| WO | WO-2017212308 A1 * | 12/2017 | | |

OTHER PUBLICATIONS

Van Bavel, Yannick, Advanced Ultrasound Beam Forming Using GPGPU Technology, (MS Thesis), Eindhoven University of Technology, 2013.

Talman, James R., et al., Integrated Circuit for High-Frequency Ultrasound Annular Array, IEEE 2003 Custom Integrated Circuits Conference, pp. 477-480.

\* cited by examiner

ULTRASOUND SIGNAL ANALOG BEAMFORMER / BEAMFORMING

RELATED APPLICATION

This application is a national filing of PCT application Serial No. PCT/IB2014/063900, filed Aug. 13, 2014, published as WO2016/024147 on Feb. 18, 2016. This application claims priority to PCT application Serial No. PCT/IB2014/063900, published as WO2016/024147 on Feb. 18, 2016.

TECHNICAL FIELD

The following generally relates to ultrasound (US) and more particularly to an ultrasound signal analog beamformer and/or beamforming, and is described with particular application to a beamformer and/or beamforming in connection with ultrasound imaging.

BACKGROUND

Ultrasound imaging has provided useful information about the interior characteristics of an object or subject under examination. In general, an ultrasound scanner includes a transducer array with transducer elements that receive echoes (acoustic signals) reflected from structure in a field of view. In B-mode imaging, the echoes are beamformed to generate scanlines, which are processed to generate a scanplane, or a two dimensional image of the field of view, which can be visually displayed through a display monitor.

Figure 1:
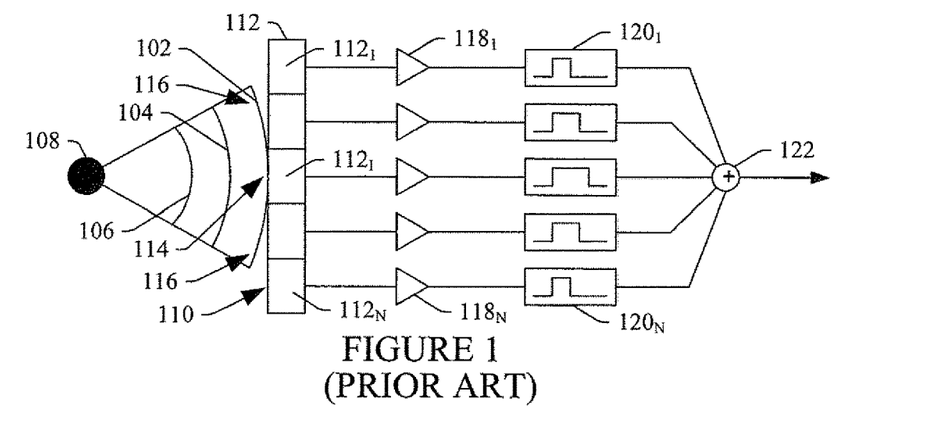
FIG. 1 shows a general prior art delay and sum beamforming.

The beamforming operation has included a "delay-and-sum" operation. An example is discussed in connection with FIG. 1. In FIG. 1, circular acoustic waves 102, 104, 106, etc. reflected from a focus region 108 propagate towards and arrive at different times at a transducer array surface 110 of transducer elements $112_1$, . . . , $112_N$. For the circular acoustic wave 102, a central region 114 arrives first at a centrally located element (e.g., the element 112) and peripheral regions 116 arrive last at end elements (e.g., the elements $112_1$ and $112_N$).

The transducer elements 112 produce analog RF signals which are respectively amplified by amplifiers $118_1$, . . . , $118_N$. The amplified signals are respectively delayed by elements $120_1$, . . . , $120_N$ so that the amplified signals reach the output of the delay elements $120_1$, . . . , $120_N$ at approximately a same time. The delayed signals are then summed with an adder 122. By delaying all of the signals, reception is focused at the focus region 108. The delay processing has been performed in the digital domain and in the analog domain.

Figure 2:
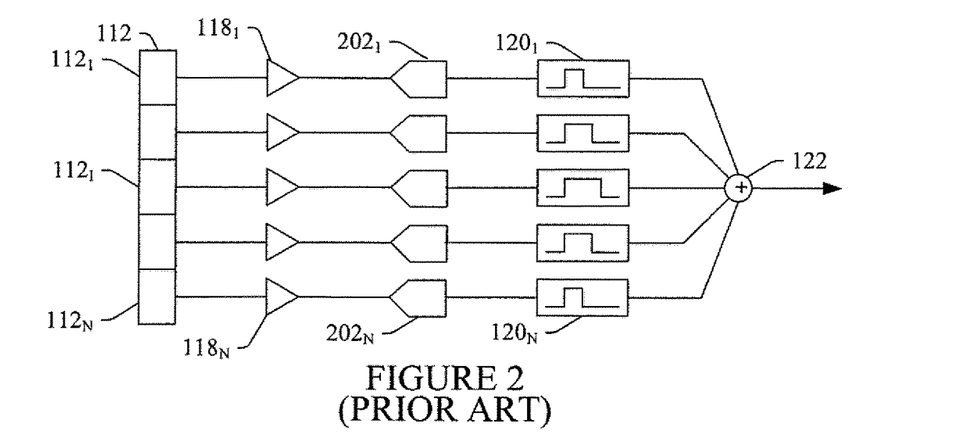
FIG. 2 shows digital domain prior art beamforming for FIG. 1.

FIG. 2 shows an example of implementing delays in the digital domain. In FIG. 2, the amplified analog RF signals are converted, via analog-to-digital converters (ADCs) $202_1$, . . . , $202_N$ to digital signals. The digital signals from the ADCs $202_1$, . . . , $202_N$ are digitally processed to introduce the delays, and the digitally delayed signals are summed, producing a digital beam sum. With this approach, each element $120_1$, . . . , $120_N$ requires its own ADC $202_1$, . . . , $202_N$.

Unfortunately, the ADCs $202_1$, . . . , $202_N$ are relatively large and high power consuming components. Furthermore, the digital beam summing network generally requires a coarse-delay shift register and a fine-delay interpolating circuit. Such circuitry may consume a substantial amount of power and space in the ASIC/FPGA for each data channel. As such, this implementation may have limited opportunities, especially when implemented in a low power ultrasound imaging device.

Figure 3:
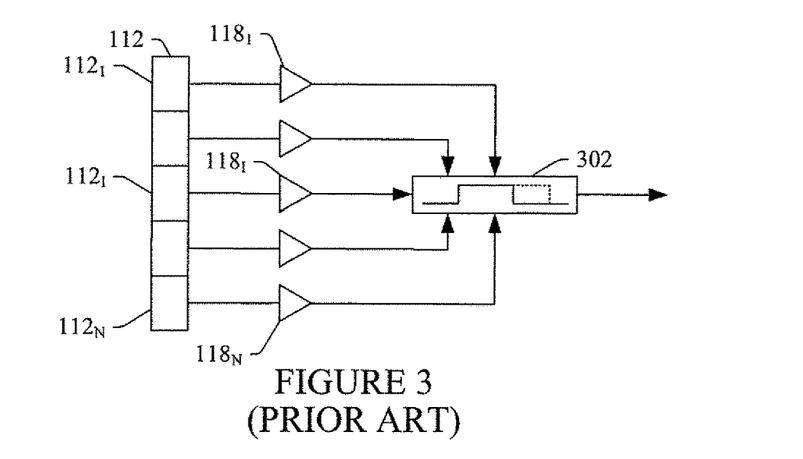
FIG. 3 shows analog domain prior art beamforming for FIG. 1.

FIG. 3 shows an example of implementing delays in the analog domain. In FIG. 3, the amplified analog RF signals are summed in an inductive-resistive-capacitive (LRC) delay line 302 with staggered inputs, where the signal from a center amplifier $118_1$ delayed the longest, and the signals from the outer channels $112_1$ and $112_N$ are delayed the shortest. The LRC delay line 302 outputs an analog beam sum. Unfortunately, this approach uses LRC delay lines, which are costly and not well suited for high density ASICs, with the inductive element placed outside of the ASIC.

SUMMARY

Aspects of the application address the above matters, and others.

In one aspect, an apparatus includes an analog beamformer that receives a set of analog RF signals. The set of analog RF signals are generated by a corresponding set of transducer elements receiving ultrasound echo signals. The analog beamformer includes a delay network (416) with a set of phase shifting networks. Each phase shifting network of the set of phase shifting networks processes a different one of the analog RF signals of the set of analog RF signals. Each phase shifting network of the set of phase shifting networks adds a delay to the corresponding analog RF signal, producing a set of delayed analog RF signals that are aligned in time. The set of phase shifting networks does not use an inductive element to determine or add the delays. The analog beamformer further includes a summer that sums the delayed analog RF signals, producing an analog beam sum.

A method includes receiving, from a transducer array, signals indicative of echoes received during a receive operation by the transducer array. The method further includes applying, through an all-pass network and in the analog domain, a delay to each of the signals based on a predetermined receive focus for the echoes. The method further includes summing the delayed signals.

In another aspect, an ultrasound imaging system includes a 1D transduce array. The 1D transduce array includes transducer elements that receives ultrasound echoes and produces analog signals indicative of the received echoes. The ultrasound imaging system further includes an integrated circuit. The integrated circuit includes an analog beamformer. The analog beamformer includes a phase shift network that delays the analog signals in the analog domain using gradient delay phase shifts, which are based on the gradient delays between the analog signals. The analog beamformer further includes a summer that sums the delayed signals. The ultrasound imaging system further includes a scan converter that scan converts the delayed and summed signal to an image for display. The ultrasound imaging system further includes a display that displays the image.

Those skilled in the art will recognize still other aspects of the present application upon reading and understanding the attached description.

BRIEF DESCRIPTION OF THE DRAWINGS

The application is illustrated by way of example and not limitation in the figures of the accompanying drawings, in which like references indicate similar elements and in which.

DETAILED DESCRIPTION

Figure 4:
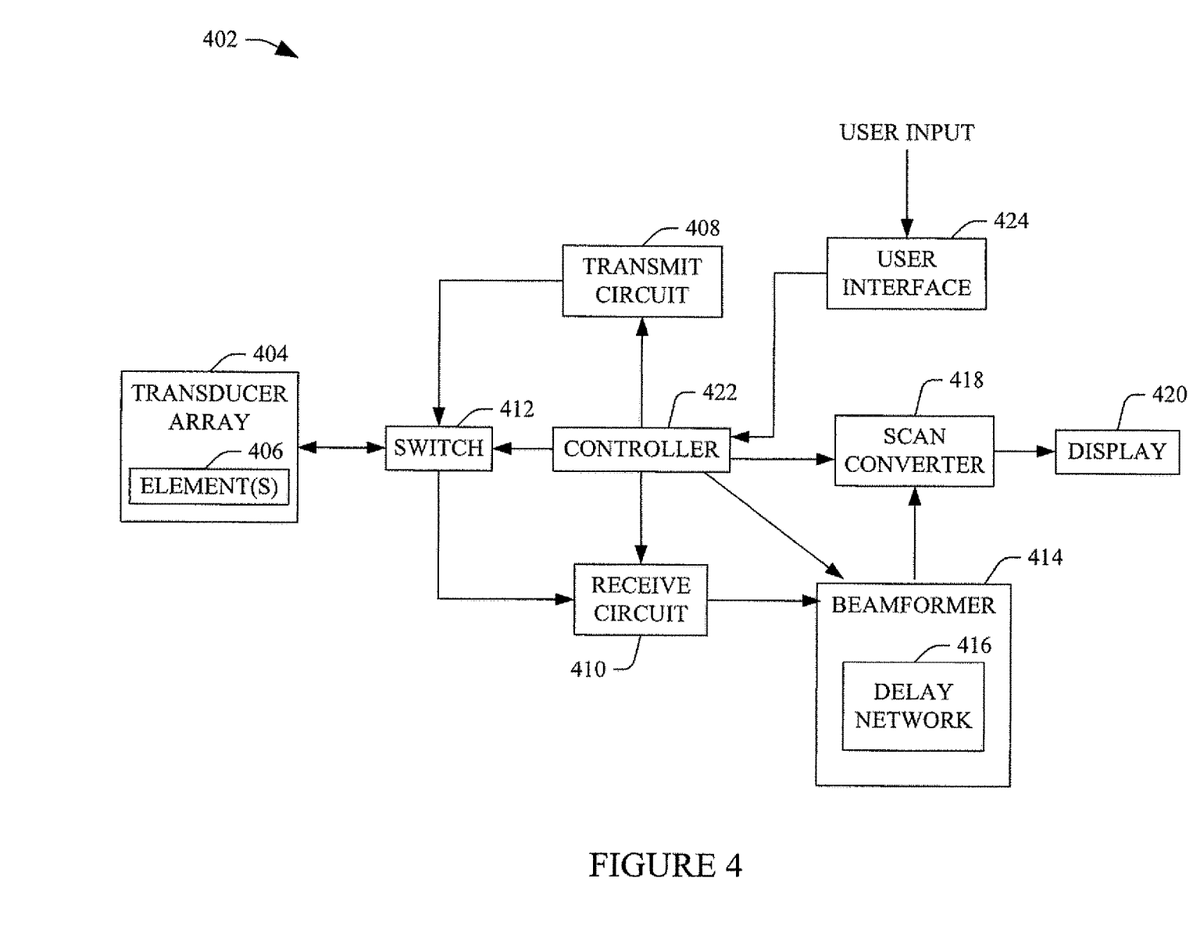
FIG. 4 schematically illustrates an imaging system with an analog beamformer.

FIG. 4 illustrates an imaging system 402 such as an ultrasound imaging system. The imaging system 402 includes at least one 1D or 2D transducer array 404 with one or more (e.g., 32, 64, 128, 196, 256, etc.) transducer elements 406. The transducer array 404 may be linear and/or curved, and/or full or sparse. The transducer array 404 can be employed to acquire data for A-mode, B-mode, etc. acquisitions, individually and in combination with other information.

The imaging system 402 further includes a transmit circuit 408, which controls the phasing and/or time of actuation of each of the elements 406, which allows for steering and/or focusing a transmitted beam. The imaging system 402 further includes a receive circuit 410 that at least routes analog RF signals from the elements 406 for processing. The imaging system 402 may also include amplifiers and/or other components that pre-process the analog RF signals. The imaging system 402 further includes a switch 412 that switches between the transmit circuit 408 and the receive circuit 410 for transmit and receive operations.

The imaging system 402 further includes an analog beamformer 414. For B-mode imaging and other applications, the analog beamformer 414 includes a delay network 416 and beamforms (e.g., delays and sums) the analog RF signals into a sequence of focused, coherent echo samples along focused scanlines of a scanplane. The analog beamformer 414 (and/or other circuitry) may also be configured to variously process the scanlines, e.g., to lower speckle and/or improve specular reflector delineation via spatial compounding and/or other processing such as FIR filtering, IIR filter, etc.'

As described in greater detail below, the analog beamformer 414 includes a delay network 416, which has a frequency independent gain, and generates delays based on phase shifts, without an inductive element such as a coil and/or other inductive element. In one instance, the entire delay network 416 can be implemented inside an integrated circuit (e.g., an IC, an ASIC, etc.), without large and power consuming ADCs and/or a digital delay element for each transducer element, and thus the number of ADC's can be reduced.

The imaging system 402 further includes a scan converter 418 and a display 420. In one instance, the scan converter 418 converts the scanlines to generate data for display, for example, by converting the scanlines to the coordinate system of the display 420, which displays the scanplane. The converting may include changing the vertical and/or horizontal scan frequency of signal based on the display 420. The scan converter 418 can be configured to employ an analog scan converting approach and/or a digital scan converting approach.

The imaging system 402 further includes a controller 422 that controls at least one of the transmit circuit 408, the receive circuit 410, the switch 412, the beamformer 414, and/or the scan converter 418. The controller 422 may include a microprocessor, a central processing unit, or the like. The imaging system 402 further includes user interface 424, which includes an input device and/or an output device for interacting with the controller 422. The input device 424 may include buttons, knobs, a touch screen, etc., and the output device may include visual (e.g., LCD, LED, etc.) and/or audible displays.

Figure 5:
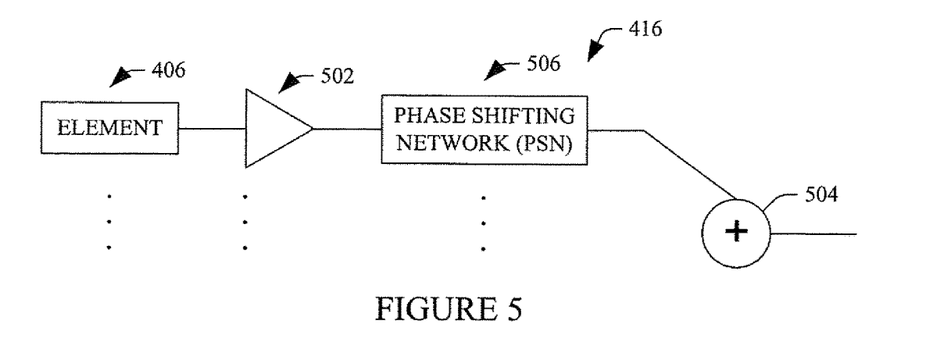
FIG. 5 schematically illustrates an example of the analog beamformer with a phase shift network.

FIG. 5 schematically illustrates an example of the delay element network 416 in connection with transducer elements 406, corresponding amplifiers 502, and a summer 504. The illustrated delay element network 416 includes a set of phase shifting networks 506 for each of the elements 406. A suitable set of phase shifting networks 506 produces a well-defined and generally constant delay profile across the transducer aperture. With such a set of phase shifting networks 506, the delay need not have an initial value of zero ("0"), as long as the value is stable and known. An example is shown in FIG. 6.

Figure 6:
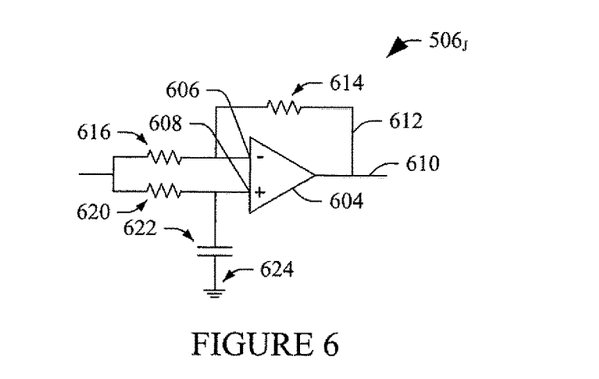
FIG. 6 schematically illustrates an example of the phase shifting network.

In FIG. 6, a phase shifting network $506_j$ includes an operational or other amplifier 604 with an inverting channel 606, a non-inverting channel 608, and an output channel 610. The phase shifting network $506_j$ further includes a feedback channel 612 (with a resistive element 614), which feeds back the output to the inverting channel 606. As such, the operational amplifier 604 is operated in a closed loop. The feedback channel 612 includes resistive elements (R1) 616 and (R2, which equals R1 in this example) 618 arranged, electrically, as a voltage divider.

The non-inverting channel 608 includes a resistive element (R) 620 and a capacitive element (C) 622, arranged, electrically, as a resistive-capacitive (RC) network, with the capacitive element 622 between the resistive element 620 and an electrical ground 624. The amplified signal from the amplifier 502 is routed through the resistive elements 616 of the inverting channel 606 and the resistive element 620 of the non-inverting channel 608.

The illustrated phase shifting network $506_j$ does not include an inductive (L) components such as a coil and/or other inductive component. The phase shifting network $506_j$ also has a frequency independent constant amplitude and can be considered an all pass network in that it passes all frequencies equally in gain, but changes the phase relationship between various frequencies by varying its phase shift as a function of frequency. For a given frequency. the phase shift can be calculated through: angle $(\theta) = 360° * (\text{delay}/\text{period})$.

The transfer function (or output divided by input) is: $H(t) = (1 - j * \omega t)/(1 + j * \omega t)$, where $\omega = 1/(RC)$ and $j$ is an imaginary number of the complex variable $j * \omega t$. The gain=1 for the entire frequency range. The RC network can be implemented in a compact integrated circuit structure. As such, this configuration can reduce space, power and cost, relative to a configuration that include an LRC network such as a 'tapped' LRC delay line in the delay circuitry and/or other circuit including an inductive element.

In general, the phase shifting for the network $506_J$ covers a range of zero degrees) (0°) through one hundred and eighty degrees (180°), such as a range from forty-five degrees (45°) through one hundred and thirty-five degrees (135°) and/or other range. For focusing for a 6 MHz transducer with an aperture representing F#=2.0, and an element pitch of 1.2λ, at 30 mm depth, a maximum delay will be approximately 600 nanoseconds (ns)=3.60λ. In one instance, this can be implemented with eight (8) phase shifting for the networks 506.

Figure 7:
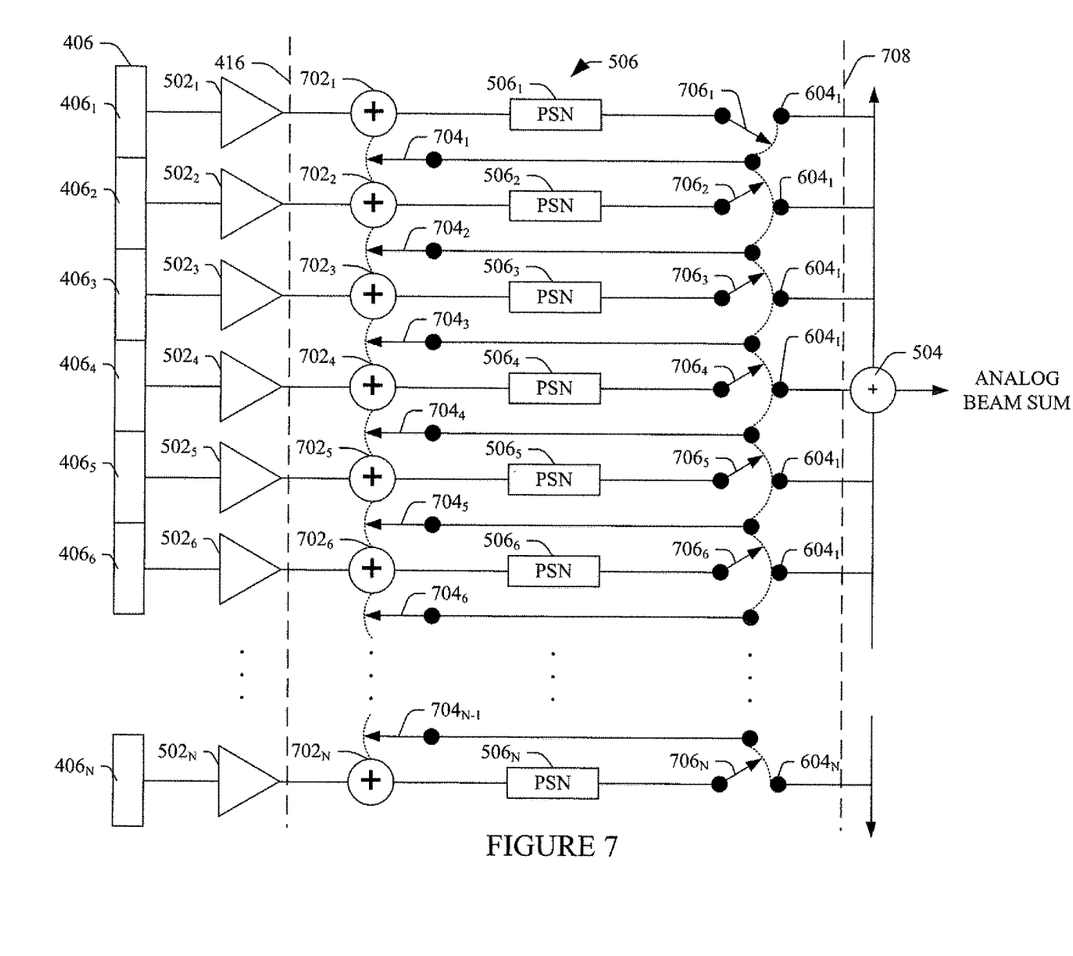
FIG. 7 schematically illustrates an example of staggered phase shifting networks using a gradient delay.

FIG. 7 shows a variation for the phase shifting for the network 506.

In FIG. 7, the outputs of respective transducer elements 406 ($406_1, \ldots, 406_N$) are amplified by corresponding amplifiers 502 ($502_1, \ldots, 502_N$). The amplified signals are routed to respective adders 702 ($702_1, \ldots, 702_N$). A first set of switches 704 ($704_1, \ldots, 704_N$) selectively connects either an output of one of the neighboring phase shifting networks 506 or nothing to an adder 702.

The output of each respective adder 702 is routed to an input of a respective phase shifting network 506. The output of each of the phase shifting networks 506 is routed, through a second set of switches 706 ($706_1, \ldots, 706_N$), to the adder 702 of one of its neighboring phase shifting networks 506 or directly to the summer 504. The output of the summer 504 is an analog beam sum. In this configuration, a gradient delay (discussed further below) is applied across the phase shifting networks 506.

Continuing with the above example (i.e., focusing for a 6 MHz transducer, an aperture representing F#=2.0, and an element pitch of 1.2λ, at 30 mm depth), a maximum delay requirement is reduced from 600 ns (full delay) to 47 ns (differential delay/delay gradient). This corresponds to a phase shift of only one hundred one degrees (101°). As such, a single phase shifting network 506 of FIG. 7 can be utilized per element 406. As such, the delay network 516 of FIG. 7 is well-suited for inclusion in an integrated chip such as an ASIC 708, as shown.

Figure 8:
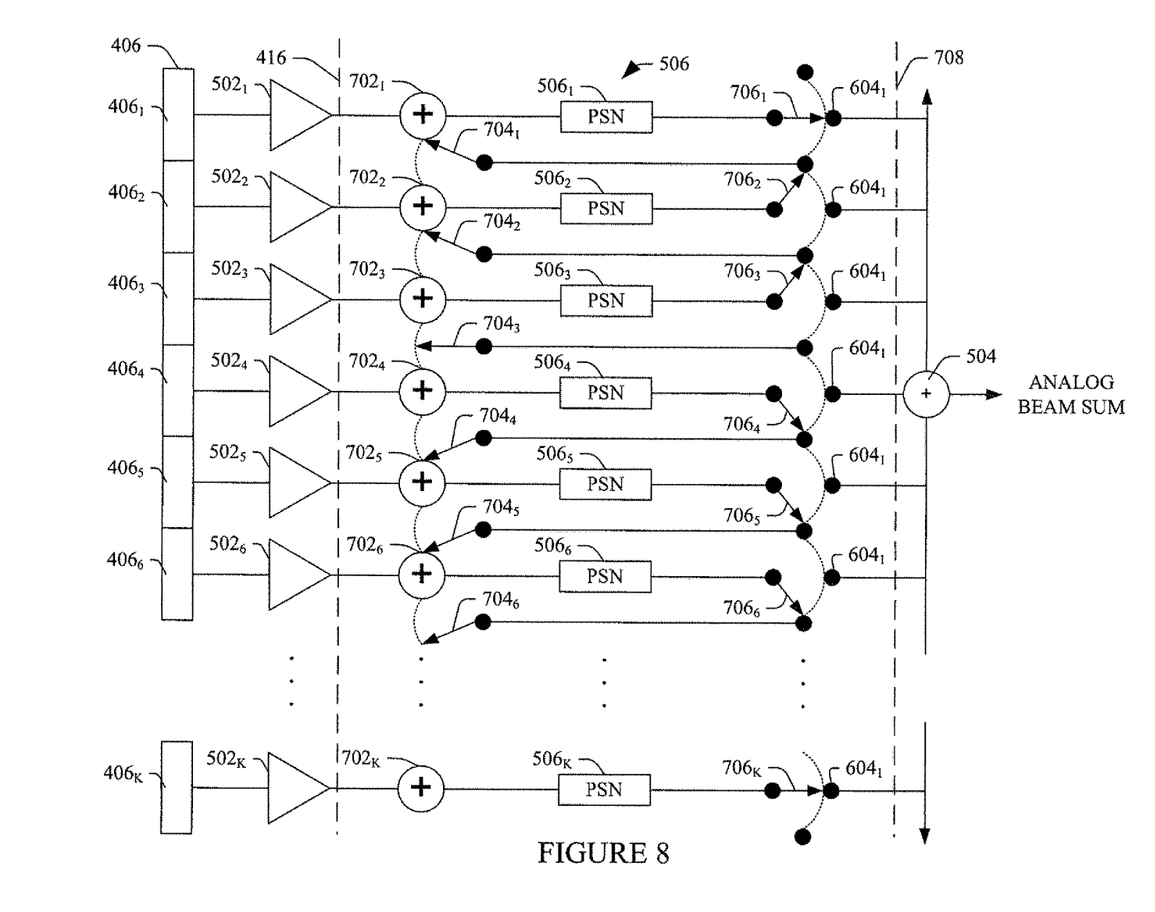
FIG. 8 schematically illustrates an example of the gradient delay.

FIG. 8 shows example an operation of the phase shifting networks 506 of FIG. 7. For this example, a sub-set $406_1, \ldots, 406_K$ of transducer elements 404 (e.g., 64 of 192 elements) are concurrently used for receive.

The transducer element $406_4$ is the center element. As such, the transducer element $406_4$ require a maximum phase shift and has a minimum gradient difference from its neighboring elements (the transducer elements $406_3$ and $406_5$) since the gradient has its minimum around the center element. The transducer elements $406_1$ and $406_K$ require no phase shift and have a maximum gradient difference from their neighboring elements since the gradient has its maximum farthest from the center element.

Figure 9:
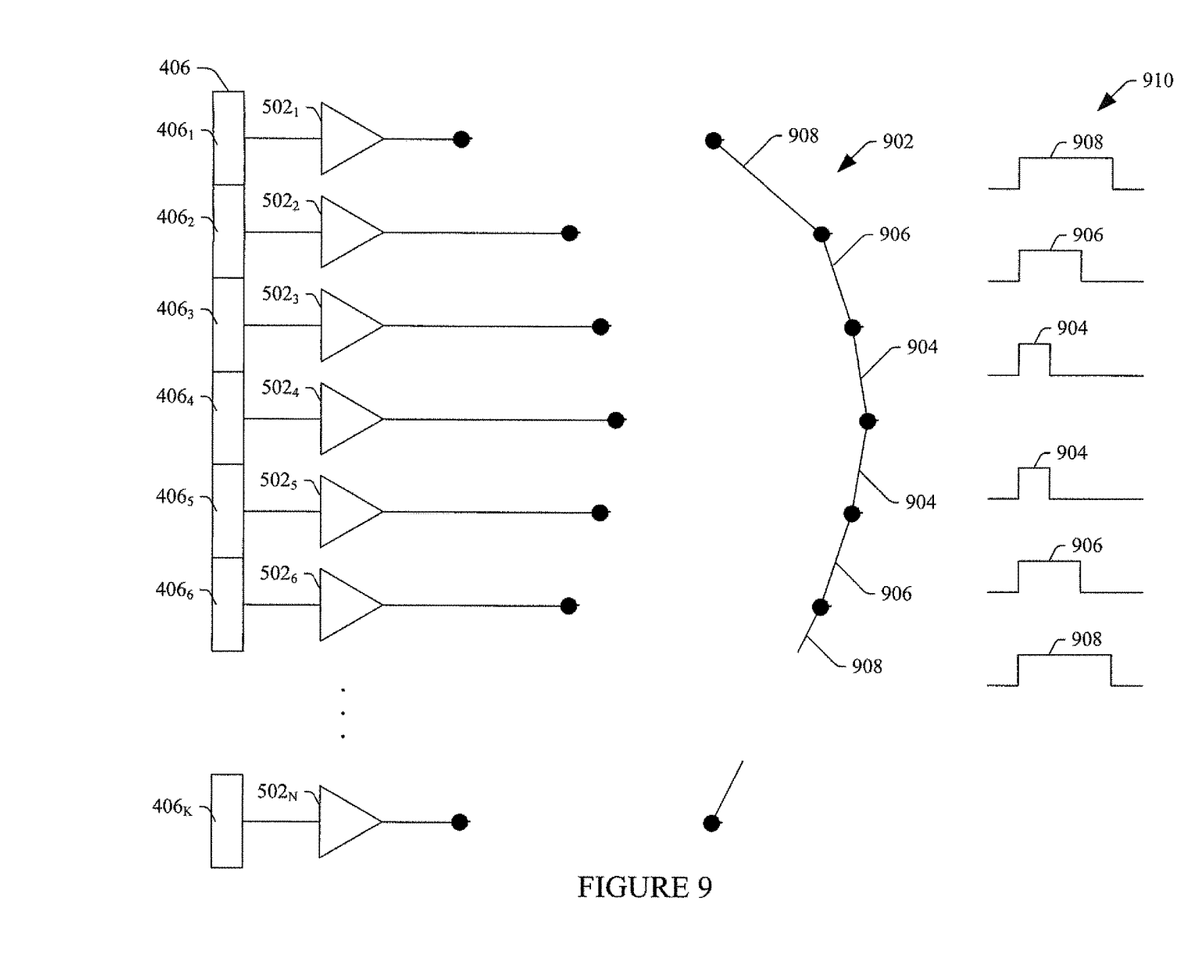
FIG. 9 schematically illustrates example operation of the staggered phase shifting network.

The above is shown in FIG. 9, which shows a gradient profile 902 across the sub-set $406_1, \ldots, 406_K$. A gradient or distance 904 between the center transducer element $406_4$ and its neighboring elements transducer elements $406_3$ and $406_5$ is shorter than a gradient 906 between the transducer element $406_3$ and its neighboring elements transducer elements $406_2$ and $406_4$ and between the transducer element $406_5$ and its neighboring elements transducer elements $406_4$ and $406_6$.

A gradient 908 between the transducer element $406_2$ and its neighboring elements transducer elements $406_1$ and $406_3$ and between the transducer element $406_6$ and its neighboring elements transducer elements $406_5$ and $406_K$ is longer than the gradient 906. The gradient distances 904, 906 and 908 are also shown at 910 through pulse widths. With these gradients, the outer elements $406_1$ and $406_K$ have no delay, while the center transducer element $406_4$ has the longest delay, which is the combined gradient distances 904, 906 and 908.

Returning to FIG. 8, the switches $706_3$ and $704_2$ route the output of the phase shift network $506_3$ to the adder $702_2$, the switches $706_2$ and $704_1$ route the output of the phase shift network $506_2$ to the adder $702_1$, and the switch $706_1$ routes the output of the phase shift network $506_1$ to the summer 504. The switches $706_4$ and $704_4$ route the output of the phase shift network $506_4$ to the adder $702_5$, the switches $706_5$ and $704_5$ route the output of the phase shift network $506_5$ to the adder $702_6$, the switches $706_6$ and $704_6$ route the output of the phase shift network $506_6$ to the adder $702_K$, and the switch $706_K$ routes the output of the phase shift network $506_K$ to the summer 504.

The output of the phase shift network $506_1$ and the phase shift network $506_K$ are summed by the summer 504, producing an analog beam sum. With this example, different sub-set of elements 406 (e.g., 0-63, 1-64, etc.) are similarly utilized. For this example, the gain is equal to one (1) because of the constant gain (gain=1) of the illustrated phase shift networks 506. This approach to "delay-and-sum" can be implemented in low power analog sub circuits without an ADC for each channel.

Figure 10:
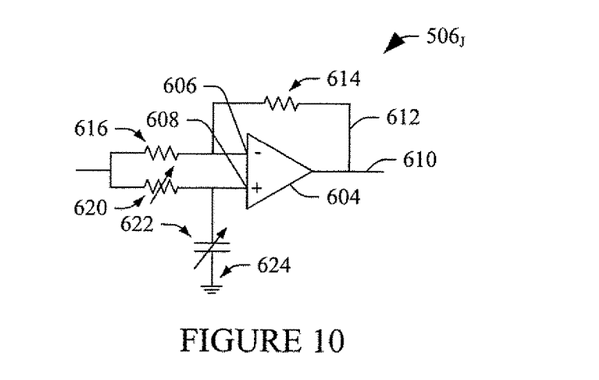
FIG. 10 schematically illustrates a variation of the phase shift network of FIG. 6.

FIG. 10 shows a variation of FIG. 6 in which the resistive element 620 and the capacitive element 622 include a variable resistor and a variable capacitor. With this variation, the delay for a transducer element can be set by adjusting a resistance of the resistive element and/or a capacitance of the capacitive element. Furthermore, the controller 422 can dynamically adjusts the resistance and/or the capacitance during receive to dynamically adjust the focus. The controller can adjust ω continuously or in predetermined steps. In another variation, only one of 620 or 622 is variable.

Figure 11:
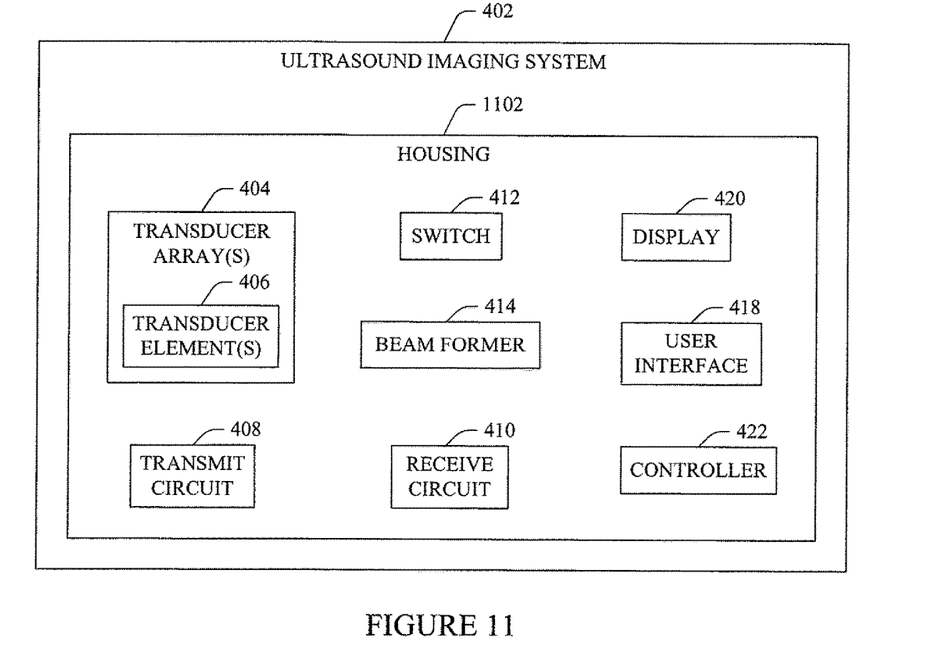
FIG. 11 schematically illustrates the imaging system as a hand-held device.

In FIG. 11, the imaging system 402 is included in a hand-held device with a single enclosure or housing 1102, which houses and physically supports the transducer array 404, the transducer elements 406, the transmit circuitry 408, the receive circuitry 410, the switch 412, the beamformer 414, the display 420, the user interface 424, and the controller 122 in the system 402. An example of a hand-held device is described in U.S. Pat. No. 7,699,776 to Walker et al., entitled "Intuitive Ultrasonic Imaging System and Related Method Thereof," and filed on Mar. 6, 2003, which is incorporated herein in its entirety by reference. Other hand-held devices are also contemplated herein.

Figure 12:
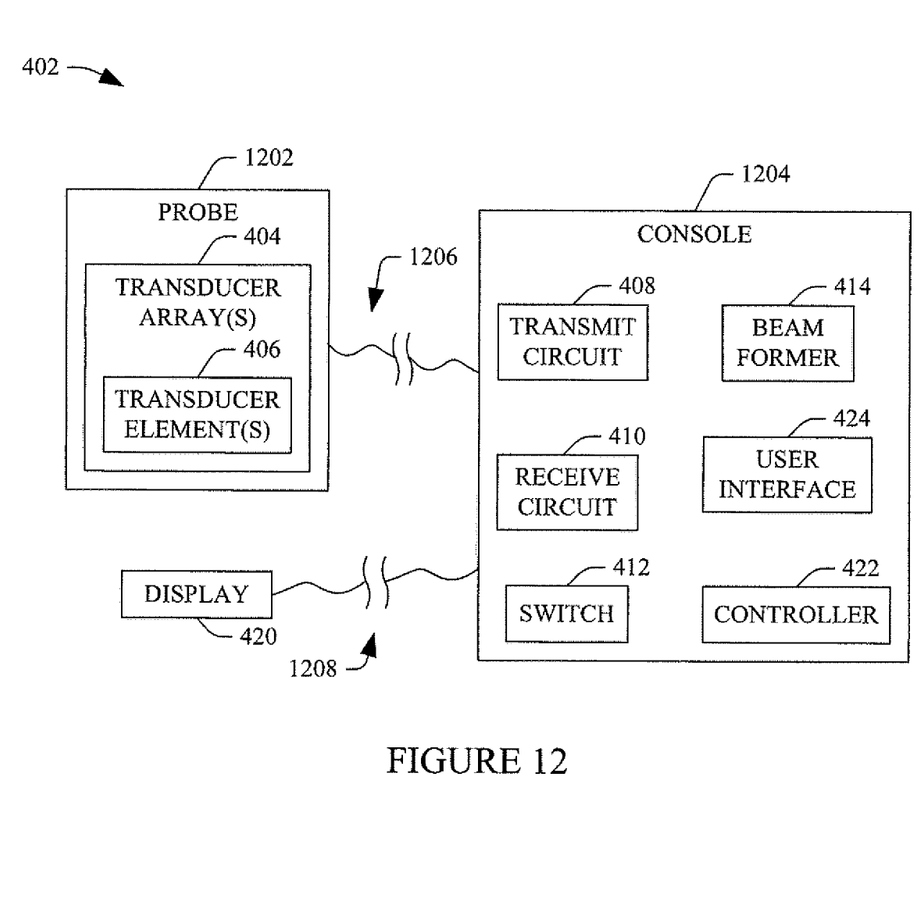
FIG. 12 schematically illustrates the imaging system with a separate probe, console and display.

In FIG. 12, the ultrasound imaging system 402 includes a console 1204 and a separate transducer probe 1202 that interfaces therewith via a communication channel 1206. The ultrasound transducer probe 1202 includes the transducer array 404 with the transducer elements 404. The console 1204 includes the transmit circuitry 408, the receive circuitry 410, the switch 412, the beamformer 414, the user interface 424, and the controller 122. The display 420 is shown as a separate from the console 1204 and the transducer probe 1202 and interfaced with the console 12040 via a communication channel 1208. In a variation, the ultrasound transducer probe 1202 is additionally or alternatively part of the console 1204.

Figure 13:
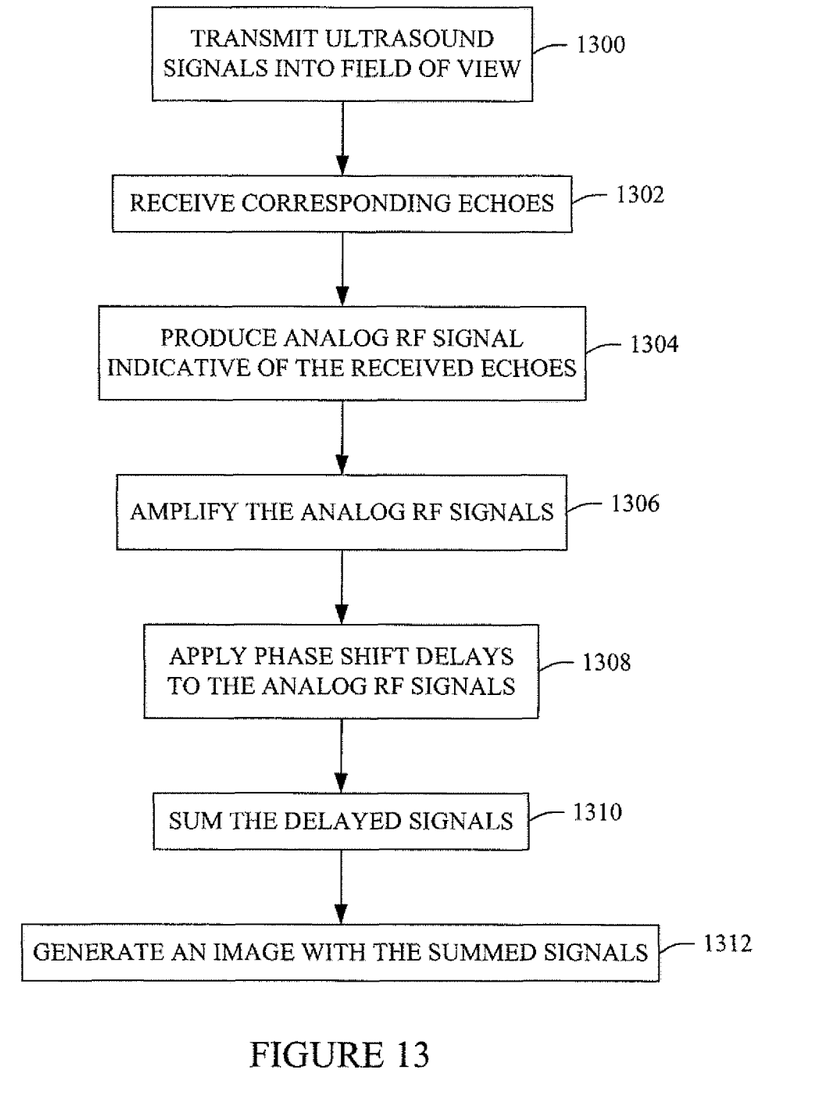
FIG. 13 illustrates an example method in accordance with the embodiments described herein.

FIG. 13 illustrates an example method in accordance with the embodiments described herein.

It is to be appreciated that the order of the following acts is provided for explanatory purposes and is not limiting. As such, one or more of the following acts may occur in a different order. Furthermore, one or more of the following acts may be omitted and/or one or more additional acts may be added.

At 1300, a set of transducer elements of a transducer array is excited to transmit ultrasound signals that traverse a field of view.

At 1302, the set of transducer elements are actuated to receive echoes generated in response to the ultrasound signals interacting with structure in the field of view.

At 1304, the set of transducer elements, in response to receiving the echoes, produces a set of analog RF signal indicative of the received echoes.

At 1306, the set of analog RF signals, optionally, are amplified.

At 1308, a set of phase shift delays are applied to the (amplified) set of analog RF signals. As described herein, this can be achieved with an analog beamformer, which has no inductive components for the delay, and which is fully integrated within an ASIC.

At 1310, the delayed set of analog RF signals are summed, as described herein and/or otherwise, producing an analog beam sum.

At 1312, the analog beam sum is further processed to generate an ultrasound image.

It is to be appreciated that the methods herein may be implemented by one or more processors executing computer executable instructions stored, encoded, embodied, etc. on computer readable storage medium such as computer memory, non-transitory storage, etc. In another instance, the computer executable instructions are additionally or alternatively stored in transitory or signal medium.

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:

1. An apparatus, comprising:
   an analog beamformer that receives a set of analog RF signals, which are generated by a corresponding set of transducer elements of an array receiving ultrasound echo signals, wherein an analog RF signal of the set of analog RF signals of each transducer element of the set of transducer elements has a gradient difference with respect to a neighboring transducer element with the analog RF signal of a center transducer element in the transducer array having a minimum gradient difference from its neighboring transducer elements and outer transducer elements having a maximum gradient difference from their neighboring elements, and the analog beamformer, including:
   a delay network, comprising:
      a set of switches;
      a set of adders; and
      a set of phase shifting networks, wherein each phase shifting network is between an associated adder of the set of adders and an associated switch of the set of switches,
   wherein each switch of the set of switches is at an output of the associated phase shifting network and routes the output of the associated phase shifting network to an adder at an input of a neighboring phase shifting network so that its output is added to an input analog RF signal of a neighboring phase shifting network and the neighboring phase shifting network processes the addition of the output of the neighboring phase shifting network and its input analog RF signal,
   wherein each phase shifting network of the set of phase shifting networks processes a different one of the analog RF signals of the set of analog RF signals and adds a delay to the corresponding analog RF signal, producing a set of delayed analog RF signals that are aligned in time, wherein the set of phase shifting networks does not use an inductive element to determine or add the delays, and
   wherein the delay for an analog RF signal is a function of a gradient difference between the analog RF signal and a neighboring analog RF signal with the analog RF signals of the outer transducer elements, each having a minimum delay applied by the phase shifting network and the analog RF signal of the center transducer element has a maximum delay applied by the phase shifting network; and
   a summer that sums the delayed analog RF signals, producing an analog beam sum.

2. The apparatus of claim 1, each of the phase shifting networks of the set of phase shifting networks, comprising:
   a resistive element with a predetermined resistance; and
   a capacitive element with a predetermined capacitance,
   wherein the resistive element and the capacitive element are electrically arranged in a RC network.

3. The apparatus of claim 2, wherein each of the phase shifting networks has the following transfer function: $H(t) = (1-j*\omega t)/(1+j*\omega t)$, where $\omega$ is a product of the resistance and the capacitance, t represents time, and j is an imaginary number of the complex variable $j*\omega t$.

4. The apparatus of claim 2, each of the phase shifting networks, further comprising:
   a voltage divider network; and
   a closed loop operational amplifier with a non-inverting input, an inverting input, an output, and a feedback loop,
   wherein the RC network is in electrical communication with the non-inverting input and the voltage divider network is in electrical communication with the inverting input.

5. The apparatus of claim 4, further comprising:
   an integrated circuit that includes the phase shifting networks.

6. The apparatus of claim 2, wherein the resistive element includes a variable resistive element, and the capacitive element includes a variable capacitive element, and the delay for an analog RF signal is a function of a resistance of the variable resistive element and a capacitance of the variable capacitive element.

7. The apparatus of claim 6, further comprising:
   a controller that dynamically adjusts at least one of the resistance or the capacitance during receive, thereby changing a receive focus.

8. The apparatus of claim 7, wherein the controller adjusts $\omega$ in predetermined steps.

9. The apparatus of claim 1, wherein only the outputs from the outermost phase shifting networks is configured to be routed to the summer.

10. The apparatus of claim 1, wherein no more than a single phase shifting network adds a delay to an analog RF signal.

11. A method, comprising:
    receiving, from a transducer array, signals indicative of echoes received during a receive operation by a set of transducer elements of the transducer array;

applying, through an all-pass network and in an analog domain, a delay to each of the signals based on a predetermined receive focus for the echoes; and wherein the all-pass network applies a delay to each of the signals as a function of gradient difference between that signal and a neighboring signal, the signal of each transducer element of the set of transducer elements having a gradient difference with respect to a neighboring transducer element with the signal of a center transducer element in the transducer array having a minimum gradient difference from its neighboring transducer elements and outer transducer elements having a maximum gradient difference from their neighboring elements by routing an output of a phase shifting network of the set of phase shifting networks to an input of a neighboring phase shifting network, and adding the output of the phase shifting network of the set of phase shifting networks to the input analog RF signal of the neighboring phase shifting network summing the delayed signals to produce an analog beam sum.

12. The method of claim 11, wherein the gradient delays represent distances between neighboring phase shifting networks of the all-pass network.

13. The method of claim 11, the applying of the delay, comprising:

applying a first gradient delay to a first phase shifting network that is at a first distance to the focus;

applying a second different gradient delay to a second phase shifting network that is at a second distance to the focus, wherein the second distance is greater than the first distance and the second gradient delay is less than the first gradient delay.

14. The method of claim 11, further, comprising:

setting a delay for a phase shifting network by adjusting at least one of a resistance of a resistive element or a capacitance of a capacitive element of an RC network of the all-pass network.

15. The method of claim 14, further, comprising:

changing the delay for the phase shifting network by changing at least one of the resistance or the capacitance.

16. The method of claim 15, wherein changing the delay changes the receive focus.

17. The method of claim 14, wherein the RC network does not include an inductive element.

18. The method of claim 14, wherein the phase shifting network does not include an inductive element.

19. An ultrasound imaging system, comprising:

a 1D transduce array with transducer elements that receives ultrasound echoes and produces a set of analog RF signals indicative of the received echoes;

an integrated circuit, including:

an analog beamformer, including: a delay network with a set of switches and a set of adders, wherein each phase shifting network is between an associated adder of the set of adders and an associated switch of the set of switches, wherein the analog beamformer receives the set of analog RF signals, which are generated by a corresponding set of transducer elements of an array receiving ultrasound echo signals, wherein an analog RF signal of the set of analog RF signals of each transducer element of the set of transducer elements has a gradient difference with respect to a neighboring transducer element with the analog RF signal of a center transducer element in the transducer array having a minimum gradient difference from its neighboring transducer elements and outer transducer elements having a maximum gradient difference from their neighboring elements, wherein each switch of the set of switches is at an output of the associated phase shifting network and routes the output of the associated phase shifting network to an adder at an input of a neighboring phase shifting network so that its output is added to an input analog RF signal of a neighboring phase shifting network and the neighboring phase shifting network processes the summation of the output of the neighboring phase shifting network and its input analog RF signal, wherein each phase shifting network of the set of phase shifting networks processes a different one of the analog RF signals of the set of analog RF signals and adds a delay to the corresponding analog RF signal, producing a set of delayed analog RF signals that are aligned in time, wherein the set of phase shifting networks does not use an inductive element to determine or add the delays, and wherein the delay for an analog RF signal is a function of a gradient difference between the analog RF signal and a neighboring analog RF signal with the analog RF signals of the outer transducer elements, each having a minimum delay applied by the phase shifting network and the analog RF signal of the center transducer element has a maximum delay applied by the phase shifting network; and a summer that sums the delayed analog RF signals, producing an analog beam sum; and a display that displays the image.

* * * * *